(12) United States Patent
Liu et al.

(10) Patent No.: US 11,554,417 B2
(45) Date of Patent: Jan. 17, 2023

(54) ARTICLE FOR PRODUCING ULTRA-FINE POWDERS AND METHOD OF MANUFACTURE THEREOF

(71) Applicant: GM Global Technology Operations LLC, Detroit, MI (US)

(72) Inventors: Zhongyi Liu, Troy, MI (US); Bin Hu, Shanghai (CN); Xiaosong Huang, Novi, MI (US); Wayne Cai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 691 days.

(21) Appl. No.: 16/681,321

(22) Filed: Nov. 12, 2019

(65) Prior Publication Data
US 2021/0138548 A1    May 13, 2021

(51) Int. Cl.
| | | |
|---|---|---|
| B22F 9/08 | (2006.01) |
| H01M 4/38 | (2006.01) |
| B22F 9/10 | (2006.01) |
| B01J 2/02 | (2006.01) |
| C01B 33/02 | (2006.01) |

(52) U.S. Cl.
CPC ............. B22F 9/082 (2013.01); B01J 2/02 (2013.01); B22F 9/10 (2013.01); C01B 33/02 (2013.01); H01M 4/386 (2013.01); B22F 2304/10 (2013.01); C01P 2004/61 (2013.01); C01P 2006/40 (2013.01)

(58) Field of Classification Search
CPC ..................................................... B22F 9/082
See application file for complete search history.

(56) References Cited

U.S. PATENT DOCUMENTS

| | | |
|---|---|---|
| 2,814,527 A | 11/1957 | Peebles et al. |
| 4,310,292 A | 1/1982 | Carlson et al. |
| 4,401,609 A | 8/1983 | McGarry et al. |
| 5,078,321 A | 1/1992 | Davis et al. |
| 6,189,804 B1 | 2/2001 | Vetter et al. |
| 2011/0163173 A1 | 7/2011 | Xie et al. |
| 2011/0180945 A1 | 7/2011 | Xie et al. |

FOREIGN PATENT DOCUMENTS

| | | |
|---|---|---|
| CN | 1087026 A | 5/1994 |
| CN | 1559696 A | 1/2005 |
| CN | 102717089 A | 10/2012 |
| JP | H1192804 A | 4/1999 |
| KR | 20140099144 A | 8/2014 |

OTHER PUBLICATIONS

Chinese Office Action Issued In CN Application No. 202011221794. 6, dated Jan. 27, 2022, 9 Pages.

*Primary Examiner* — Khanh T Nguyen
(74) *Attorney, Agent, or Firm* — Cantor Colburn LLP

(57) ABSTRACT

A multistage centrifugal atomizer comprises an outer shell that contains an inlet port and an outlet port and that encloses a tundish, a first inclined rotating surface and a second inclined rotating surface. The first inclined rotating surface is opposedly disposed to the second inclined rotating surface. The inlet is used to introduce a molten material into the multistage atomizer and the outlet is used to remove ultra-fine particles having a D50 of less than 20 micrometers.

20 Claims, 3 Drawing Sheets

ARTICLE FOR PRODUCING ULTRA-FINE POWDERS AND METHOD OF MANUFACTURE THEREOF

INTRODUCTION

This disclosure relates to an article for producing ultra-fine powders and methods for manufacturing the article as well as the fine-powders. More particularly, this disclosure relates to a centrifugal atomizer that can be used to produce fine-powders having a very narrow polydispersity index (variation in particle sizes).

Centrifugal atomizers, such as those used with spray driers, employ an atomizer head which is rotated at a relatively high speed, and to which the feed material (which is to be atomized) is supplied. The head is provided with impact elements whereby the feed material is broken up into small droplets or fragments, which are discharged outwardly for suspension in a drying gas. One particular type of atomizer head that has been widely used, employs spaced upper and lower plates which are secured to a vertical shaft, and which are connected by circumferentially spaced atomizing bars. The feed material is delivered into a space in the central portion of the head, and as it moves outwardly between the upper and lower plates, it is ultimately impacted and atomized by the spaced bars.

Conventional atomizing devices of the type described above are subject to certain disadvantages. While the atomization obtained is suitable for many commercial operations, it is difficult to maintain a relatively uniform degree of atomization, particularly for different types of feed material. Uniform atomization is desirable because it greatly facilitates proper operation of the spray drier. It avoids objectionable discharge of oversized particles against the side walls of the drier, it facilitates operation of the drier at a desired high capacity, and it tends to produce a final product having uniform moisture content. Another disadvantage is that the impact elements are subject to wear. Any attempt to repair the worn parts is troublesome and expensive, and generally the principal parts of the head must be discarded and replaced. The cost of repairing or replacing such worn parts adds considerably to the expense of spray drying operations.

It is therefore desirable to provide a relatively simple centrifugal atomizer which is capable of producing uniform atomization with a wide variety of feed materials.

SUMMARY

In an exemplary embodiment, a multistage centrifugal atomizer comprises an outer shell that contains an inlet port and an outlet port and that encloses a tundish, a first inclined rotating surface, and a second inclined rotating surface. The first inclined rotating surface is opposedly disposed to the second inclined rotating surface. The inlet is used to introduce a molten material into the multistage atomizer and the outlet is used to remove ultrafine particles having a D50 of less than 20 micrometers.

In another exemplary embodiment, a convex surface of the first inclined rotating surface faces the inlet of the multistage centrifugal atomizer and a convex surface of the second inclined rotating surface faces the outlet of the multistage centrifugal atomizer.

In yet another exemplary embodiment, the first inclined rotating surface is operative to receive a molten material from the tundish and to discharge the molten material in the form of particles, where the second inclined rotating surface is operative to receive the particles from the first inclined rotating surface and to comminute them to a smaller particle size than that received from the first inclined rotating surface.

In yet another exemplary embodiment, an angle γ between an upper inner surface and the outer lower surface of the second inclined rotating surface varies from 90 degrees to 180 degrees.

In yet another exemplary embodiment, a first shaft that contacts the first inclined rotating surface and a second shaft that contacts the second inclined rotating surface are coaxially mounted and are in rotary communication with a motor.

In yet another exemplary embodiment, the first inclined rotating surface is a cone or a conical section and the second inclined rotating surface is a cone or a conical section and where a convex surface of the first inclined rotating surface faces the inlet port and where a convex surface of the second inclined rotating surface faces the outlet port.

In yet another exemplary embodiment, the first inclined rotating surface has an internal angle that is less than an internal angle of the second inclined rotating surface.

In yet another exemplary embodiment, the convex surface of the first inclined rotating surface comprises a portion that is textured with grooves and patterns for facilitating comminution of a molten material that contacts it.

In yet another exemplary embodiment, the convex surface of the first inclined rotating surface includes a portion that has a non-stick properties.

In yet another exemplary embodiment, a concave surface of the second inclined rotating surface comprises a portion that is textured with grooves and patterns for facilitating comminution of a molten material that contacts it.

In yet another exemplary embodiment, the convex surface of the second inclined rotating surface is in fluid communication with the outlet port of the multistage centrifugal atomizer.

In yet another exemplary embodiment, the multistage centrifugal atomizer comprises an ultrasonic transducer that is in operative communication with either the first inclined rotating surface, the second inclined rotating surface or both the first inclined rotating surface and the second inclined rotating surface.

In yet another exemplary embodiment, the ultrasonic transducer provide up to 50 microns of to-and-fro linear motion at 20 kHz or above to the first inclined rotating surface, the second inclined rotating surface or both the first inclined rotating surface and the second inclined rotating surface.

In yet another exemplary embodiment, the multistage centrifugal atomizer discharges ultrafine particles having D50 diameter of 20 micrometers or less.

In yet another exemplary embodiment, the multistage centrifugal atomizer discharges ultrafine particles having D50 diameter of 20 micrometers or less.

In yet another exemplary embodiment, the ultrafine particles comprise silicon or silicon alloys for use in batteries.

In one exemplary embodiment, a method for manufacturing ultrafine particles comprises disposing a molten material into an inlet port of a multistage centrifugal atomizer, where the multistage centrifugal atomizer comprises an outer shell that contains an inlet port and an outlet port and that encloses a tundish, a first inclined rotating surface and a second inclined rotating surface. The first inclined rotating surface is opposedly disposed to the second inclined rotating surface. The inlet is used to introduce a molten material into the multistage atomizer and the outlet is used to remove ultrafine particles having a D50 of less than 20 micrometers.

The molten material is charged from the tundish to the first inclined rotating surface to form particles. The particles are charged from the first inclined rotating surface to the second inclined rotating surface to form the ultrafine particles.

In another exemplary embodiment, the method further comprising removing the ultrafine particles from the outlet port.

In yet another exemplary embodiment, the method further comprises subjecting either the first inclined rotating surface, the second inclined rotating surface or both the first inclined rotating surface and the second inclined rotating surface to ultrasonic vibration.

In yet another exemplary embodiment, the method further comprises charging of the molten material from the tundish to the first inclined rotating surface to form particles and the charging the particles from the first inclined rotating surface to the second inclined rotating surface to form the ultrafine particles are conducted simultaneously.

The above features and advantages, and other features and advantages of the disclosure are readily apparent from the following detailed description when taken in connection with the accompanying drawings.

BRIEF DESCRIPTION OF THE FIGURES

Other features, advantages and details appear, by way of example only, in the following detailed description, the detailed description referring to the drawings in which.

DETAILED DESCRIPTION

Figure 1:
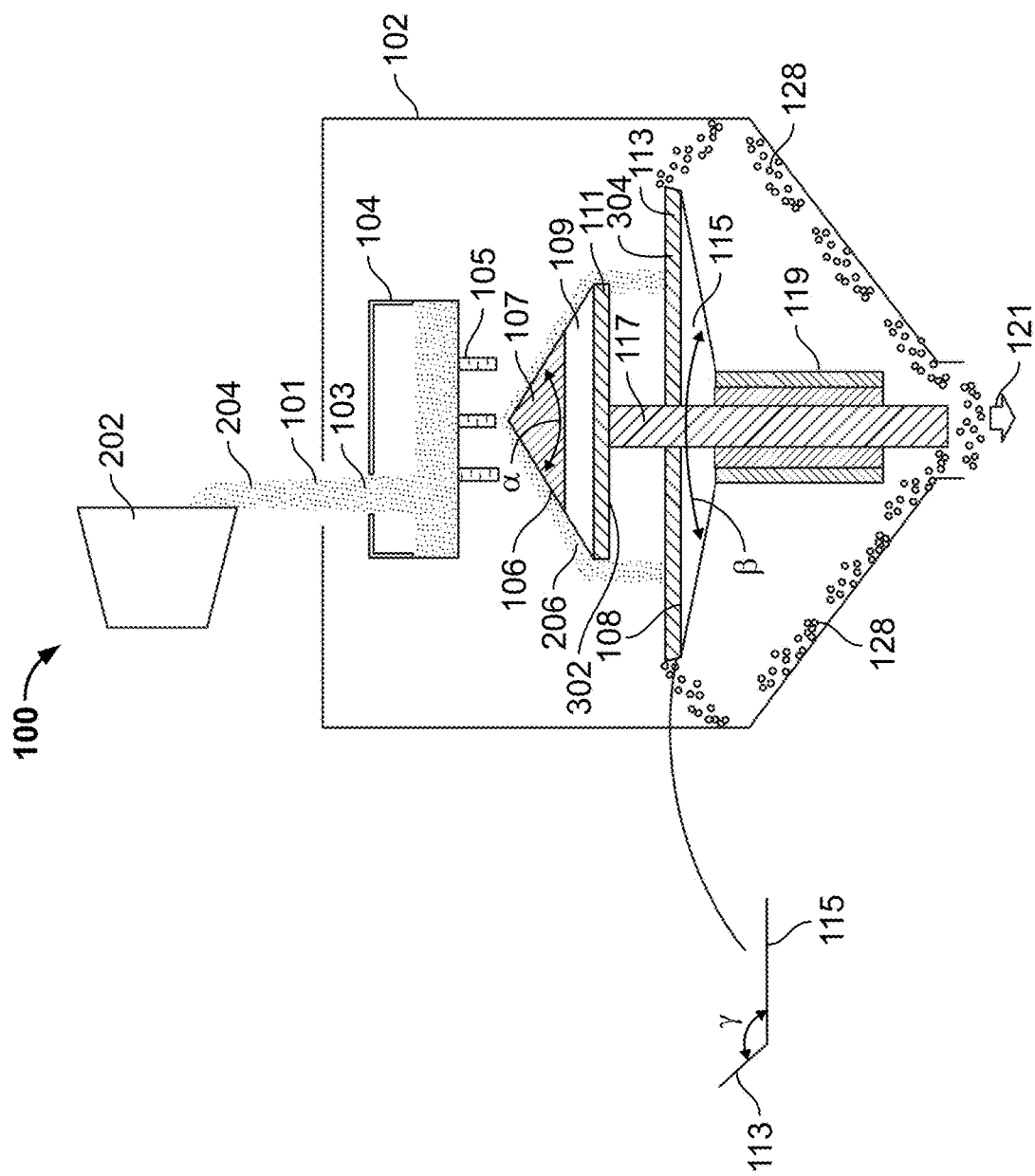
FIG. 1 is a schematic depiction of an exemplary multistage centrifugal atomizer.

The following description is merely exemplary in nature and is not intended to limit the present disclosure, its application or uses. It should be understood that throughout the drawings, corresponding reference numerals indicate like or corresponding parts and features.

Figure 2B:
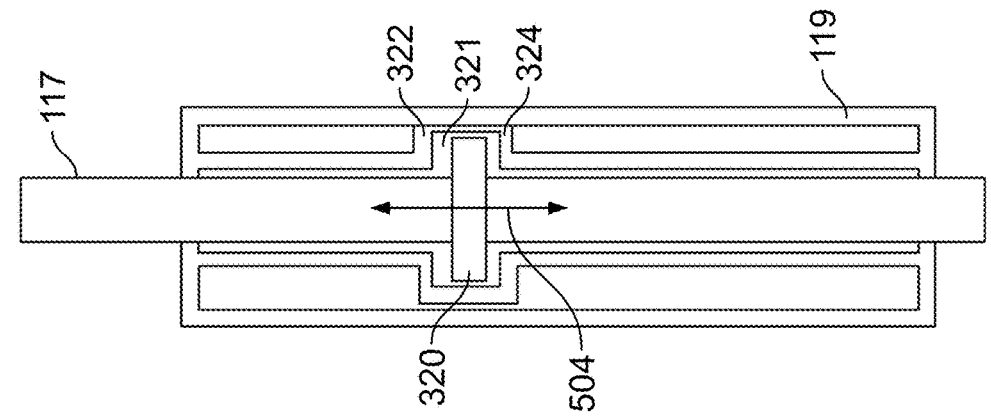
FIG. 2B is another schematic depiction of an exemplary multistage centrifugal atomizer that shows the arrangement between the two shafts.

In accordance with an exemplary embodiment, disclosed herein is a multistage centrifugal atomizer whose design facilitates the production of particles that have a smaller average particle size (hereinafter ultrafine particles) with a smaller particle size distribution than other commercially available centrifugal atomizers. The multistage centrifugal atomizer increases the flow rate of molten material into the centrifuge and therefore also increases the production rate of the ultrafine particles when compared with other commercially available centrifugal atomizers. The multistage coaxial centrifugal atomizer is advantageous in that it produces ultrafine particles (with a targeted D50 of less than 20 micrometers) having a spherical shape, a narrow particle size distribution and a homogeneous composition for automotive and non-automotive (energy, space, marine, and the like) industrial applications. D represents the diameter of powder particles, and D50 means a cumulative 50% point of diameter (or 50% pass particle size) is less than 20 micrometers.

In an embodiment, the multistage coaxial centrifugal atomizer can be used to produce silicon or silicon alloy particles having a D50 of less than 20 micrometers, preferably less than 15 micrometers, and more preferably less than 10 micrometers. These uniform diameter silicon alloy or silicon particles may be used in batteries and energy storage devices.

The comminution of the molten material may be conducted in two or more stages. In the first stage, the molten material is discharged from a tundish to a first inclined rotating surface. This promotes comminution of the molten material into particles. The second stage involves the discharge of the particles from the first inclined rotating surface to a second inclined rotating surface. The second stage promotes a further comminution of the particles into ultrafine particles. The ultrafine particles (having 50% of the particles with an average size of less than 20 micrometers) is then discharged from the centrifugal atomizer to a collection vessel. In an embodiment, ultrasonic energy may be imparted to either the first inclined rotating surface, the second inclined rotating surface, or to both the first and the second inclined rotating surface. The ultrasonic energy facilitates comminution of the molten material as well as de-agglomeration of particles from agglomerates.

FIG. 1 depicts an exemplary schematic of the multistage centrifugal atomizer 100 of this disclosure. The atomizer 100 comprises an outer shell 102 with an inlet port 101 for charging the molten material that is to be comminuted. The molten material may be a metal, a ceramic, a polymer, or a combination thereof. Located within the outer shell 102 is a tundish 104 which receives the material that is charged through the inlet port 101. The tundish 104 contains a plurality of outlet ports 105 through which the material can be discharged to a first inclined rotating surface 106. The molten material contacts the outer (convex) surface of the first inclined rotating surface 106.

The atomizer 100 also contains a first inclined rotating surface 106 and a second inclined rotating surface 108 that function in stages to comminute the molten material that is charged to the atomizer.

The first inclined rotating surface 106 is preferably in the form of a cone. The convex surface of the first inclined rotating surface contains a section 107 that contains grooves and patterns for facilitating comminution of the material that contacts it. The bottom 111 of the first inclined rotating surface is coated with a non-stick coating to prevent the material from adhering to the surface. The non-stick coating facilitates a rapid discharging of the material particles from the first inclined rotating surface 106 to the second inclined rotating surface 108, from which the particles are discharged to an outlet port 121 of the multistage centrifugal atomizer 100. A portion 109 of the convex surface that lies between the section 107 and the bottom 111 is where the molten material collects during the process of atomization as it is discharged from the tundish to the first inclined rotating surface.

An example of the second inclined rotating surface 108 is a rotating cup. The second inclined rotating surface may be viewed as a hollowed out cone or conical section into which the particles discharged from first inclined rotating surface are discharged. The concave surface of the second inclined rotating surface 108 contains a portion 113 that is coated with a non-stick surface. The portion 115 that abuts the non-stick surface is inclined and facilitates discharge from the second inclined rotating surface 108 to the outlet port 121 of the multistage centrifugal atomizer 100. In an embodiment, the second inclined rotating surface is opposedly disposed to the first inclined rotating surface. The material particles formed on the convex surface of the first inclined rotating surface are discharged to the concave surface of the second inclined rotating surface. The second inclined rotating surface is in fluid communication with the outlet port 121 of the atomizer. Ultrafine particles formed in the second inclined rotating surface are discharged to a storage vessel via the outlet port 121. The ultrafine particles formed on the second inclined rotating surface are discharged into the outlet port 121 after travelling over and across an upper lip of the portion 113 that is coated with a non-stick surface. The ultrafine particles are transported by gravity to the outlet port 121 as shown in the FIG. 1.

The tundish 104 contains one or more inlets 103 for discharging a molten material from a furnace 202 into it. The tundish 104 should be capable of withstanding the temperature of the melt without deforming or reacting with the material. The tundish 104 may have one or more outlet ports 105 having a suitable diameter to facilitate a quick discharge of the molten material to the first inclined rotating surface 106. The number of outlet ports 105 and the diameter of the ports may be adjusted to control particle size during and after atomization. The tundish may have two or more outlet ports, preferably three or more outlet ports, and so on.

The tundish may be stationary or alternatively, may rotate about a vertical shaft (not shown). In a preferred embodiment, the tundish is stationary. In another embodiment, a pressure may be applied to the tundish to facilitate discharge of the molten material.

The diameter of the tundish outlet ports may be 1 to 10 millimeters. In a preferred embodiment, the diameter of the tundish outlet ports may be 2 to 4 millimeters.

The first inclined rotating surface 106 is located downstream of the tundish. The first inclined rotating surface 106 is preferably a cone or a conical section, where the outer surface has a first internal apex angle $\alpha$ that ranges from 30 to 150 degrees, preferably 60 to 120 degrees. The first inclined rotating surface 106 has an outer upper surface 107 that is convex and an opposed inner surface that is concave. The apex angle $\alpha$ is the internal apex angle on the concave inner surface. The outer surface of the first inclined rotating surface 106 faces the upper inner surface of the outer shell 102, with its apex pointing towards the inlet port 101. While the inclined surface 106 may be defined by a straight line that extends from the apex to the edges, the inclined surface may also be curved.

The first inclined rotating surface 106 contacts a first shaft 117 which is in rotary communication with a motor (not shown). Rotary motion transmitted to the first shaft 117 by the motor is imparted to the first inclined rotating surface 106. The rotary motion imparts a centrifugal force to the molten material, which causes it to undergo a first comminution to form the fine particles. This first comminution may be viewed as the first stage in the formation of the ultrafine particles.

The upper outer surface 107 is a textured surface with grooves and pits that facilitates comminution of the molten material that contacts it after being discharged from the tundish. The bottom 111 of the first inclined rotating surface is coated with a non-stick coating. The non-stick coating is capable of withstanding the temperature of the molten material without itself melting or degrading. The non-stick coating may be a polymer and/or a ceramic to prevent the molten material from adhering to the surface. Examples of non-stick polymers are fluorocarbons (e.g., TEFLON), polysiloxanes, polyimide-polysiloxanes, or a combination thereof. Anodized aluminum, enameled cast iron, and superhydrophobic surfaces (surfaces that have texturing that have a contact angle of 90 to 140 degrees) may also be used as the non-stick feature of the bottom 111. The non-stick coating facilitates a rapid discharge of the material particles from the first inclined rotating surface 106 to the second inclined rotating surface 108, from which the particles are discharged to the outlet port 121 of the multistage centrifugal atomizer 100. The non-stick coating also prevents the molten material from agglomerating to form larger particles.

The second inclined rotating surface 108 is located downstream of the first inclined rotating surface 106. The second inclined rotating surface 108 is preferably an inverted cone or an inverted conical section, where the inner surface has a second internal apex angle $\beta$ that is greater than the first internal angle $\alpha$. The second internal apex angle $\beta$ ranges from 90 to 180 degrees, preferably 120 to 170 degrees. The second inclined rotating surface 108 has an outer lower surface 115 that is convex and an opposed inner surface that is concave. The apex angle $\beta$ is the internal apex angle on the concave inner surface. The outer surface of the second inclined rotating surface 108 faces the bottom inner surface of the outer shell 102, with its apex (which may be an imaginary point formed by extending the outer surfaces 108) pointing towards the outlet port 121. While the inclined surface 108 may be defined by a straight line that extends from the apex to the edges, the inclined surface may also be curved.

The upper inner surface 113 of the second inclined rotating surface 108 is also provided with a non-stick coating. In an embodiment, the angle $\gamma$ between the upper inner surface 113 and the outer lower surface 115 of the second inclined rotating surface 108 varies from 90 degrees to 180 degrees, preferably 135 to 158 degrees. This angle facilitates communication of the molten material to a smaller particle size.

The non-stick coating materials detailed above may be utilized. The non-stick coating prevents the particles that are discharged from the first inclined rotating surface from agglomerating on the upper inner surface 113 to form larger particles. The ultrafine particles that are formed on contact with the second inclined rotating surface 108 are discharged from the second inclined rotating surface 108 via stream 128 and collect at the bottom of the inner surface and are discharged by gravity to a storage vessel (not shown) via outlet port 121.

The second inclined rotating surface 108 contacts a second shaft 119 which is in rotary communication with the motor (not shown). Rotary motion transmitted to the second shaft 119 by the motor is imparted to the second inclined rotating surface 108. The rotary motion imparts a centrifugal force to the particles formed in the first comminution, which causes it to undergo a second comminution to form the ultrafine particles. This second comminution may be viewed as the second stage in the formation of the ultrafine particles.

While the FIG. 1 depicts the lower perimeter 302 of the first inclined rotating surface 106 as being above an imaginary plane formed at the upper perimeter 304 of the second inclined rotating surface 108, it is possible for the lower perimeter 302 to protrude into the open space that lies below the imaginary plane formed at the upper perimeter 304.

In an embodiment depicted in the FIG. 2A, the first shaft 117 and the second shaft 119 are concentrically arranged about an axis (they are coaxial) and both of these shafts may be rotated via rotary motion imparted to them by the same motor. The FIG. 2A depicts portions of the device of FIG. 1, without the outer shell and the tundish. The FIG. 2A depicts the arrangement of the shafts that are used to drive the first and second inclined rotating surfaces 106 and 108. The FIG. 2B is an amplified view of the arrangement of the shafts with a key that ensures that the same vertical motion is applied to the inclined surfaces by a piezoelectric stack (discussed later). FIG. 2B depicts how vertical motion provided by the piezo electric stack can be restricted so that there is no variation in vertical travel by the first inclined rotating surface 106 and the second inclined rotating surface 108.

Figure 2A:
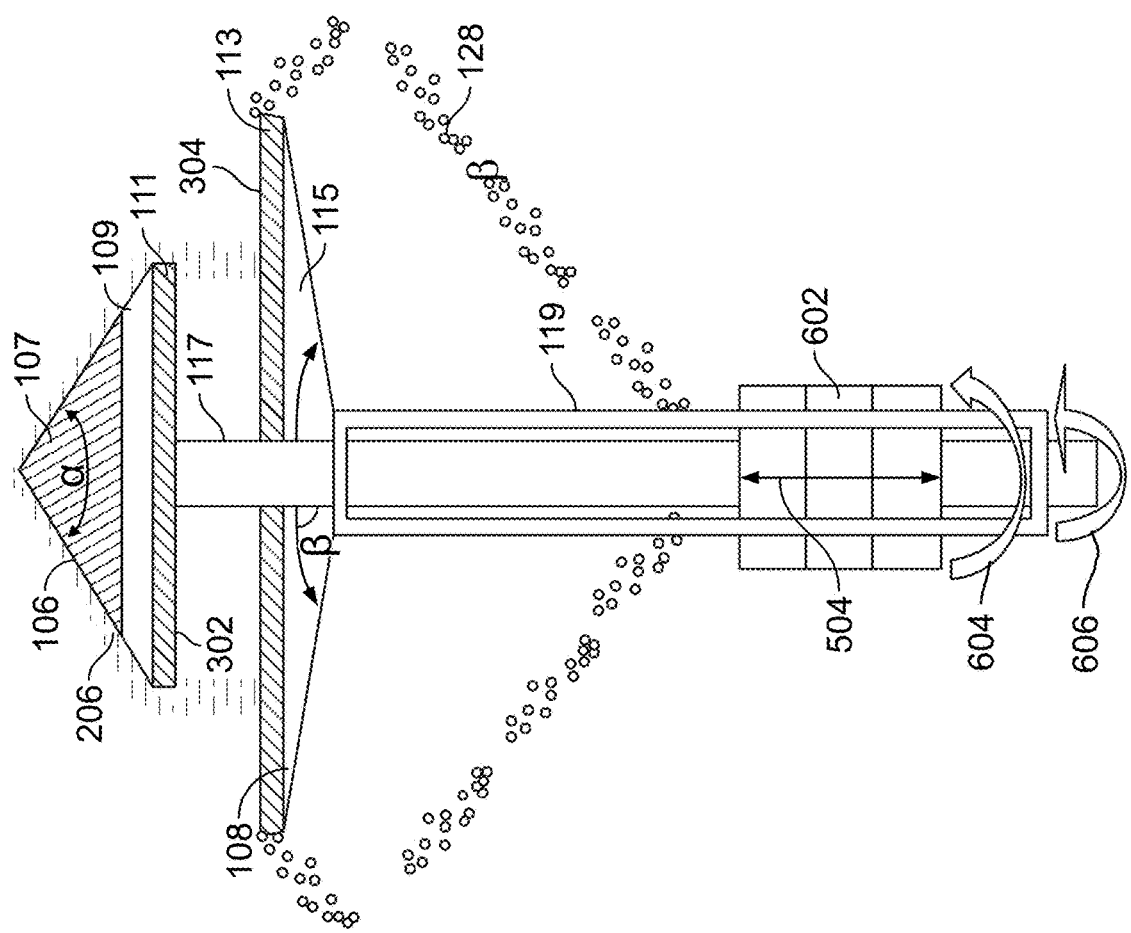
FIG. 2A is a another schematic depiction of an exemplary portion of the multistage centrifugal atomizer that shows the arrangement between the two shafts and a piezoelectric stack.

With regard to the FIGS. 1 and 2A, the coaxial arrangement facilitates the introduction of independent rotating speeds for the different inclined rotating surfaces 106 and 108. In an embodiment, the first shaft 117 and the second shaft 119 may be rotated by rotary motion imparted by two separate motors (shown by arrows with numerals 602 and 604). In another embodiment, a single motor with two transmissions may be used to drive the two axes at different rotational velocities. The first shaft 117 and the second shaft 119 (and consequently the first inclined rotating surface 106 and the second inclined rotating surface 108 respectively) may rotate in the same direction, or alternatively, may rotate in opposite directions if desired. In a preferred embodiment, both the first shaft 117 and the second shaft 119 can rotate in the same direction. Rotating in the same direction will help accelerate the molten material and increase its kinetic energy when the adhesion/friction between the surface of the rotating disc and the molten material is high enough (and no "slippage" occurs).

Disposed on one of or both shafts 117 and 119 (See FIG. 2A) is a piezo electric stack 602 that promotes vertical motion of the first inclined rotating surface 106 and/or the second inclined rotating surface 108 with respect to one another. An ultrasonic transducer (not shown) included in the piezoelectric stack 602 imparts ultrasonic energy along arrow 504 (to and fro vertical information) to either the shaft 117, the shaft 119 or to both shafts 117 as well as 119. In an embodiment, the piezoelectric stack 602 is in vertical (to and fro) communication with a single shaft—the shaft 119 (which is in communication with the second inclined rotating surface 108).

FIG. 2B depicts one embodiment of the relationship between the first shaft 117 and the second shaft 119. The first shaft 117 contains a key 320 that contacts two stops 322 and 324 provided by a slot 321 located in the second shaft 119.

The rotational ratio of the first shaft 117 to the second shaft 119 (and consequently of the first inclined rotating surface 106 to the second inclined rotating surface 108 respectively) may vary from 0.1:1 to 1:0.1. In a preferred embodiment, the rotational ratio of the first shaft 117 to the second shaft 110 is 1:1.

Figure 3:
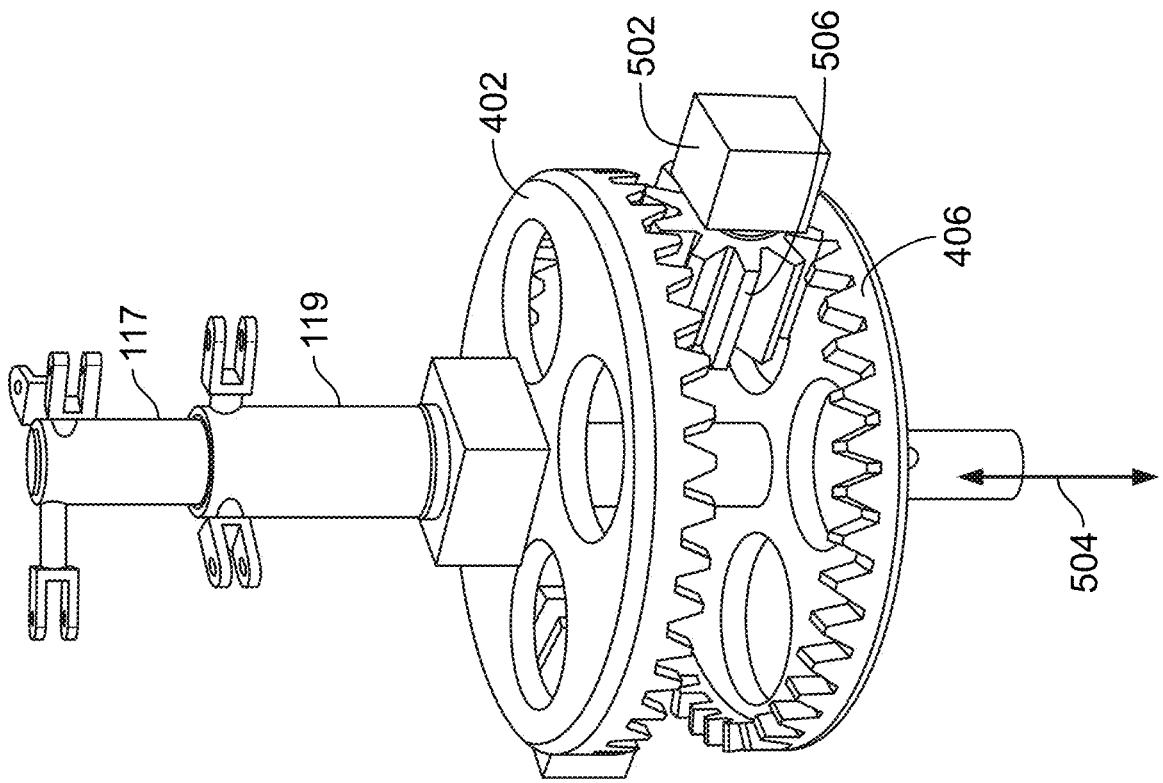
FIG. 3 is a schematic depiction of an exemplary drive for providing rotary motion to the first inclined rotating surface and the second inclined rotating surface.

FIG. 3 depicts one exemplary arrangement of the gears that may be used to rotate the respective shafts 117 and 119 as well as to impart ultrasonic energy to the molten material. A motor 502 is in rotary communication with a gear 506. The gear 506 is in a bevel gear arrangement with two gears 402 and 406 which are in turn in rotary communication with the shafts 119 and 117 respectively. The rotary motion is thus transmitted from the motor 502 to the shafts 117 and 119 via the gears 506, 406 and 402 respectively. An ultrasonic transducer (not shown) imparts ultrasonic energy in the direction of arrow 504 to either the shaft 117, the shaft 119 or to both shafts 117 as well as 119. The transducer along with an optional integrated mechanical booster (not shown), can provide up to 50 microns of to-and-fro linear motion at 20 kHz or above. The presence of an ultrasonic transducer contributes to finer particle sizes since the acceleration is very high, and suppresses skull formation (particle build-up an agglomeration on the inclined rotating surfaces).

The ultrasound transducer produces linear to-and-fro motion in either the shaft 117, the shaft 119 or to both shafts 117 as well as 119 that facilitates comminution and de-agglomeration of the ultrafine particles.

In one method of producing the ultrafine particles having a D50 of less than 20 micrometers, the molten material comprising a metal, a ceramic, a polymer, or combinations thereof is first poured into the tundish via the inlet port of the atomizer and the inlet port of the tundish. In a first stage, the molten material is discharged from one or more of the outlet ports of the tundish to the first inclined rotating surface. The centrifugal forces of the first inclined rotating surface results in some comminution of the molten material to form particles. In a second stage, these particles are discharged from the first inclined rotating surface to the second inclined rotating surface, where they undergo further comminution to form the ultrafine particles. The ultrafine particles are then discharged from the outlet port of the atomizer to a storage vessel. It is to be noted that the first stage and the second stage of comminution may be performed simultaneously even though the molten material is subjected to the second stage after the first stage. The molten material may be simultaneously subjected to ultrasonic energy during the first stage, the second stage or during both the first stage and the second stage.

In one embodiment, in one method of manufacturing the multistage centrifugal atomizer, the tundish is first fixedly attached to the inside of the outer shell of the atomizer. The outer shell of the atomizer may contain an upper portion and a lower portion. The tundish is affixed to the upper portion of the outer shell. The first shaft and the second stage are coaxially mounted (mounted concentrically) with one end located in the outer shell of the atomizer, while the other end is in communication with a set of gears mounted in a bevel gear arrangement. The bevel gear is in rotary communication with the motor that drives rotation of the rotary inclined surfaces. Following the locating of the shafts in the outer shell, the second inclined rotary surface is attached to one shaft (the first or the second shaft), while the first inclined rotary surface is attached to the other shaft that is not in communication with an inclined rotary surface.

The multistage centrifugal atomizer is advantageous in that it can produce a monodisperse particle distribution. The particle distribution is very narrow (having a polydispersity index of less than 1.2) and has an average particle size where D50 is less than 20 micrometers. The particles have a spherical shape, narrow particle size distribution and homogeneous composition and can therefore be used in automotive and nonautomotive (energy, space, marine, etc.) industrial applications. The method is also much more rapid when compared with conventional commercially available centrifugal atomizers. In short, the atomizer disclosed herein can produce larger quantities of superior particles in a shorter period of time when compared with commercially available centrifugal atomizers.

The presently disclosed multistage centrifugal atomizer may be used for gas/water atomization and in those applications where the particle's morphology, purity, and particle size distribution are less restrictive. Slippage (which adversely affects the comminution of molten material) may occur in a single-stage atomizer but this can be avoided with the multistage acceleration disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A multistage centrifugal atomizer comprising:
an outer shell that contains an inlet port and an outlet port and that encloses:
a tundish,
a first inclined rotating surface; and
a second inclined rotating surface; where the first inclined rotating surface is opposedly disposed to the second inclined rotating surface; where the inlet is used to introduce a molten material into the multistage atomizer and where the outlet is used to remove ultrafine particles having a D50 of less than 20 micrometers.

2. The multistage centrifugal atomizer of claim 1, where a convex surface of the first inclined rotating surface faces the inlet of the multistage centrifugal atomizer and where a convex surface of the second inclined rotating surface faces the outlet of the multistage centrifugal atomizer.

3. The multistage centrifugal atomizer of claim 1, where the first inclined rotating surface is operative to receive a molten material from the tundish and to discharge the molten material in the form of particles, where the second inclined rotating surface is operative to receive the particles from the first inclined rotating surface and to comminute them to a smaller particle size than that received from the first inclined rotating surface.

4. The multistage centrifugal atomizer of claim 1, wherein an angle $\gamma$ between an upper inner surface and the outer lower surface of the second inclined rotating surface varies from 90 degrees to 180 degrees.

5. The multistage centrifugal atomizer of claim 1, where a first shaft that contacts the first inclined rotating surface and a second shaft that contacts the second inclined rotating surface are coaxially mounted and are in rotary communication with a motor.

6. The multistage centrifugal atomizer of claim 5, where the first inclined rotating surface is a cone or a conical section and where the second inclined rotating surface is a cone or a conical section and where a convex surface of the first inclined rotating surface faces the inlet port and where a convex surface of the second inclined rotating surface faces the outlet port.

7. The multistage centrifugal atomizer of claim 6, where the first inclined rotating surface has an internal angle that is less than an internal angle of the second inclined rotating surface.

8. The multistage centrifugal atomizer of claim 7, where the convex surface of the first inclined rotating surface comprises a portion that is textured with grooves and patterns for facilitating comminution of a molten material that contacts it.

9. The multistage centrifugal atomizer of claim 7, where the convex surface of the first inclined rotating surface includes a portion that has a non-stick properties.

10. The multistage centrifugal atomizer of claim 9, where the convex surface of the second inclined rotating surface is in fluid communication with the outlet port of the multistage centrifugal atomizer.

11. The multistage centrifugal atomizer of claim 10, further comprising an ultrasonic transducer that is in operative communication with either the first inclined rotating surface, the second inclined rotating surface or both the first inclined rotating surface and the second inclined rotating surface.

12. The multistage centrifugal atomizer of claim 11, where the multistage centrifugal atomizer discharges ultrafine particles having D50 diameter of 20 micrometers or less.

13. The multistage centrifugal atomizer of claim 12, where the ultrafine particles comprise silicon or silicon alloys for use in batteries.

14. The multistage centrifugal atomizer of claim 10, where the ultrasonic transducer provide up to 50 microns of to-and-fro linear motion at 20 kHz or above to the first inclined rotating surface, the second inclined rotating surface or both the first inclined rotating surface and the second inclined rotating surface.

15. The multistage centrifugal atomizer of claim 7, where a concave surface of the second inclined rotating surface comprises a portion that is textured with grooves and patterns for facilitating comminution of a molten material that contacts it.

16. The multistage centrifugal atomizer of claim 1, where the multistage centrifugal atomizer discharges ultrafine particles having D50 diameter of 20 micrometers or less.

17. A method comprising:
disposing a molten material into an inlet port of a multistage centrifugal atomizer, where the multistage centrifugal atomizer comprises:
an outer shell that contains an inlet port and an outlet port and that encloses:
a tundish,
a first inclined rotating surface; and
a second inclined rotating surface; where the first inclined rotating surface is opposedly disposed to the second inclined rotating surface; where the inlet is used to introduce a molten material into the multistage atomizer and where the outlet is used to remove ultrafine particles having a D50 of less than 20 micrometers;
charging the molten material from the tundish to the first inclined rotating surface to form particles; and
charging the particles from the first inclined rotating surface to the second inclined rotating surface to form the ultrafine particles.

18. The method of claim 17, further comprising removing the ultrafine particles from the outlet port.

19. The method of claim 17, further comprising subjecting either the first inclined rotating surface, the second inclined rotating surface or both the first inclined rotating surface and the second inclined rotating surface to ultrasonic vibration.

20. The method of claim 17, where the charging of the molten material from the tundish to the first inclined rotating surface to form particles and the charging the particles from the first inclined rotating surface to the second inclined rotating surface to form the ultrafine particles are conducted simultaneously.

* * * * *